United States Patent
Mishina et al.

[11] Patent Number: 5,858,274
[45] Date of Patent: Jan. 12, 1999

[54] TREATING AGENT FOR LIQUID CRYSTAL ALIGNMENT

[75] Inventors: Makoto Mishina; Terumi Sato; Kiyoshi Sawahata; Atsuko Tanaka; Hiroyoshi Fukuro, all of Funabashi, Japan

[73] Assignee: Nissan Chemical Industries, Ltd., Tokoyo, Japan

[21] Appl. No.: 875,929

[22] PCT Filed: Feb. 9, 1996

[86] PCT No.: PCT/JP96/00283

§ 371 Date: Aug. 13, 1997

§ 102(e) Date: Aug. 13, 1997

[87] PCT Pub. No.: WO96/25688

PCT Pub. Date: Aug. 22, 1996

[30] Foreign Application Priority Data

Feb. 13, 1995 [JP] Japan .................................. 7-024017

[51] Int. Cl.⁶ .......................... C09K 19/38; C09K 19/56; G02F 1/1337
[52] U.S. Cl. .................. 252/299.4; 252/299.01; 428/1; 349/132; 349/135; 349/136
[58] Field of Search .......................... 252/299.4, 299.01; 428/1; 349/132, 135, 136; 528/188

[56] References Cited

U.S. PATENT DOCUMENTS

| | | | |
|---|---|---|---|
| 5,298,590 | 3/1994 | Isogai et al. ............................. | 528/188 |
| 5,350,539 | 9/1994 | Mishina et al. ....................... | 252/299.4 |
| 5,397,847 | 3/1995 | Harris et al. ............................ | 525/432 |
| 5,422,419 | 6/1995 | Abe et al. ................................ | 528/342 |
| 5,477,360 | 12/1995 | Sunohara et al. ....................... | 349/132 |
| 5,571,579 | 11/1996 | Kato et al. .................................. | 428/1 |
| 5,596,534 | 1/1997 | Sunohara et al. ....................... | 349/132 |

FOREIGN PATENT DOCUMENTS

| | | |
|---|---|---|
| 64-4720 | 1/1989 | Japan . |
| 2-287324 | 11/1990 | Japan . |
| 5-43687 | 2/1993 | Japan . |
| 6-138463 | 5/1994 | Japan . |

*Primary Examiner*—Shean C. Wu
*Attorney, Agent, or Firm*—Oblon, Spivak, McClelland, Maier & Neustadt, P.C.

[57] ABSTRACT

A treating agent for liquid crystal alignment useful for formation of a liquid crystal alignment film obtained by coating a film on a substrate equipped with transparent electrodes, baking the film, and subjecting the film surface to a rubbing treatment, wherein the treating agent for liquid crystal alignment contains a polyimide precursor containing a repeating unit of the formula (I) and a solvent-soluble polyimide resin containing a repeating unit of the formula (II), and at least 1 mol % of $R_4$ of the solvent-soluble polyimide resin of the formula (II) being a bivalent organic group constituting a diamine which has a long-chain alkyl group or fluorine-containing alkyl group with a carbon number of at least 6, and the solvent-soluble polyimide resin of the formula (II) being from 1 to 80% by weight based on the total polymer weight:

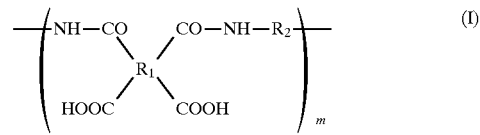

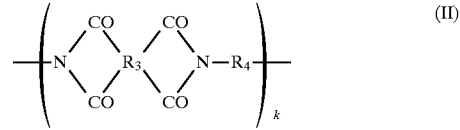

(wherein each of $R_1$ and $R_2$ is a tetravalent organic group which constitutes tetracarboxylic acid or its derivative, each of $R_2$ and $R_4$ is a bivalent organic group which constitutes a diamine, and m and k are positive integers).

13 Claims, No Drawings

TREATING AGENT FOR LIQUID CRYSTAL ALIGNMENT

This application is a 371 of PCT/JP96/00283 filed Feb. 9, 1996.

TECHNICAL FIELD

The present invention relates to a treating agent for liquid crystal alignment useful for liquid crystal devices such as a liquid crystal display. More particularly, it relates to a treating agent for liquid crystal alignment for the production of a liquid crystal alignment film which has a high tilt angle to a substrate of liquid crystal molecules and is excellent in electrical properties of liquid crystal devices such as voltage holding ratio and charge-accumulation property.

BACKGROUND ART

In recent years, active matrix operation systems using, for example, a thin-layer transistor, have been actively developed by virtue of their excellent display performance. Among them, a so-called TFT (thin film transister) display system is the most representative system, and further progress of its display performance have been made. Together with such progress, it is required to improve various properties at the same time with respect to liquid crystal alignment films. As liquid crystal alignment film properties usually required for a so-called TFT display system, most basic necessary properties are, for example, the tilt angle of liquid crystal molecules, voltage holding ratio and charge-accumulation property by a direct current voltage. Alignment film materials which satisfy all of these properties have been desired. Namely, it is required to develop a treating agent for liquid crystal alignment by which a liquid crystal alignment film which is high in the tilt angle and voltage holding ratio and brings about sufficiently low charge-accumulation by a direct current voltage, is obtained.

In conventional treating agents for liquid crystal alignment, film properties are generally improved by employing one type of a polyimide or a polyimide precursor and selecting its structure from various ones.

It is known that all these properties are affected by the structure of the polyimide to be used, and it is the actual circumstance that all the properties of the alignment films are not adequately satisfied by only one polymer structure. Namely, with respect to the conventional alignment treating agents, for example, one agent can exhibit excellent properties of the voltage holding ratio, but is low in the tilt angle or large in the charge-accumulation property, and another one is excellent in the tilt angle and the voltage holding ratio, but large in the charge-accumulation property. Accordingly, no material has been found by which these free properties are satisfied adequately and at the same time.

Further, for the practical mass production of liquid crystal devices, not only the above basic properties but also various properties such as adhesive properties to a substrate, printing properties and rubbing resistance are required.

Namely, it is required to develop various properties including productivity as well as the above basic properties, and it is the actual circumstance that adequate performance can not necessarily be obtained only by a single polyimide resin.

Conventional treating agents for liquid crystal alignment are generally, for example, the one obtained by coating a varnish having a solvent-soluble polyimide dissolved in a solvent on a substrate, and baking it to form a polyimide film, and then rubbing treated it to form a liquid crystal alignment film, or the one obtained by coating a polyimide precursor solution on a substrate, and baking it generally at a temperature of at least 150° C. for imide-modification to form a polyimide film, and then rubbing treated to prepare a liquid crystal alignment film.

Here, it is known that liquid crystal alignment films formed by a solvent-soluble polyimide are generally excellent in the voltage holding ratio, but such films have problems that the tilt angle is not adequate or its stability is not adequate, or the charge-accumulation property is not adequately low. Further, such films are known to be poor in the adhesive properties to a substrate and the printing properties.

On the other hand, the ones employing the polyimide precursor have advantages that a high and more stable tilt angle can be obtained and the charge-accumulation property can be made small, or advantages that the adhesive properties to a substrate and the printing properties are excellent. However, when the voltage holding ratio is poor and further the imide-modification degree is not sufficient, there are disadvantages that, for example, the solvent resistance of the film surface is poor.

Namely, both the solvent-soluble polyimide and the polyimide precursor have advantages and disadvantages contrary to each other as a liquid crystal alignment film. Accordingly, it is not necessarily easy to satisfy all the properties required for alignment films for a so-called TFT.

As mentioned above, excellent treating agents for liquid crystal alignment which satisfy the properties such as the voltage holding ratio, tilt angle and charge-accumulation property at the same time and adequately, have been desired. Namely, it is an object of the present invention to provide a treating agent for liquid crystal alignment which is excellent in the film properties such as voltage holding ratio, tilt angle and charge-accumulation property, or excellent in the adhesive properties to a substrate and the printing properties.

DISCLOSURE OF THE INVENTION

The present inventors have intensively studied to solve the above problems and as a result, have accomplished the present invention.

Namely, the present invention provides a treating agent for liquid crystal alignment useful for formation of a liquid crystal alignment film obtained by coating a film on a substrate equipped with transparent electrodes, baking the film, and subjecting the film surface to a rubbing treatment, which comprises a polyimide precursor which has a repeating unit of the formula (I):

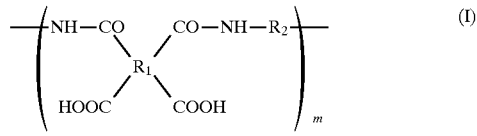

wherein $R_1$ is a tetravalent organic group constituting a tetracarboxylic acid or its derivative, $R_2$ is a bivalent organic group constituting a diamine and m is a positive integer and has a reduced viscosity of from 0.05 to 5.0 dl/g (as measured in N-methylpyrrolidone at a temperature of 30° C. and at a concentration of 0.5 g/dl), and a solvent-soluble polyimide resin which has a repeating unit of the formula (II):

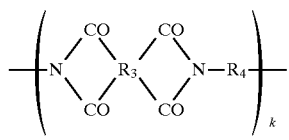

wherein $R_3$ is a tetravalent organic group constituting a tetracarboxylic acid or its derivative, $R_4$ is a bivalent organic group constituting a diamine and k is a positive integer, and has a reduced viscosity of from 0.05 to 5.0 dl/g (as measured in N-methylpyrrolidone at a temperature of 30° C. and a concentration of 0.5 g/dl), wherein at least 1 mol % of $R_4$ of the solvent-soluble polyimide resin of the formula (II) being a bivalent organic group constituting a diamine which has a long-chain alkyl group or fluorine-containing alkyl group with a carbon number of at least 6, and the solvent-soluble polyimide resin of the formula (II) being from 1 to 80% by weight based on the total polymer weight.

The present invention will be described in detail. The treating agent for liquid crystal alignment of the present invention is coated on a substrate equipped with transparent electrodes, and dried and baked to form a polyimide film, and then the film surface is subjected to a rubbing treatment to prepare a liquid crystal alignment film.

The treating agent for liquid crystal alignment of the present invention is a composition containing a polyimide precursor of the formula (I) and a solvent-soluble polyimide of the formula (II) having a long-chain alkyl group or fluorine-containing alkyl group.

Here, the polyimide precursor of the formula (I) is obtained by reacting and polymerizing a tetracarboxylic dianhydride and its derivative with a diamine in a polar solvent.

As specific examples of the tetracarboxylic dianhydride and its derivative of the formula (I), the following may be mentioned.

Aromatic tetracarboxylic acids such as pyromellitic acid, benzophenone tetracarboxylic acid, biphenyl tetracarboxylic acid and naphthalene tetracarboxylic acid, and their dianhydrides as well as their dicarboxylic acid diacid halides; alicyclic tetracarboxylic acids such as cyclobutane tetracarboxylic acid, cyclopentane tetracarboxylic acid, cyclohexane tetracarboxylic acid and 3,4-dicarboxy-1,2,3,4-tetrahydro-1-haphthalene succinic acid, and their dianhydrides as well as their dicarboxylic acid diacid halides; aliphatic tetracarboxylic acids such as butane tetracarboxylic acid, and their dianhydrides as well as their dicarboxylic acid diacid halides.

Further, these tetracarboxylic acids and their derivatives may be used alone or in combination as a mixture of two or more of them.

Here, especially to increase the liquid crystal alignment film properties by the treating agent for liquid crystal alignment of the present invention, it is preferred that at least 10 mol % of the whole tetracarboxylic acid components of the formula (I) to be used is the above aromatic tetracarboxylic acids and their dihydrides as well as their dicarboxylic acid diacid halides.

Further, as specific examples of the diamine of the formula (I), the following may be mentioned. However, it should be understood that the present invention is by no means restricted to such specific examples.

Specific examples of the diamine include p-phenylenediamine, 1,4-bis(4-aminophenyl)benzene, 4,4'-diaminobiphenyl, 3,3'-dimethyl-4,4'-diaminobiphenyl, 3,3'-dimethoxy-4,4'-diaminobiphenyl, 3,3'-dihydroxy-4,4'-diaminobiphenyl, 3,3'-dichloro-4,4'-diaminobiphenyl, 3,3'-dicarboxy-4,4'-diaminobiphenyl and 4,4'-bis(4-aminophenoxy)biphenyl; aromatic diamines such as diaminodiphenylmethane, diaminodiphenyl ether, 2,2-diaminodiphenylpropane, 4,4'-diaminodiphenylsulfone, diaminobenzophenone, 1,3-bis(4-aminophenoxy)benzene, 1,4-bis(4-aminophenoxy)benzene, 4,4'-di(4-aminophenoxy)diphenylsulfone, 2,2-bis[4-(4-aminophenoxy)phenyl]propane and 1,1,1,3,3,3-hexafluoro-2,2-bis[4-(4-aminophenoxy)phenyl]propane; alicyclic diamines such as diaminodicyclohexylmethane, diaminodicyclohexyl ether and diaminocyclohexane; and aliphatic diamines such as 1,2-diaminoethane, 1,3-diaminopropane, 1,4-diaminobutane and 1,6-diaminohexane. Further, a diaminosiloxane of the following formula:

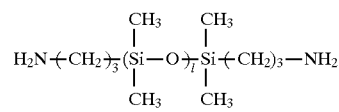

wherein l is an integer of from 1 to 10, may further be mentioned.

Furthermore, for the purpose of increasing the tilt angle, a diamine having a long chain alkyl group such as 4,4'-diamino-3-dodecyldiphenyl ether, 1-dodecanoxy-2,4-diaminobenzene, 1,1-bis(4-aminophenyl)cyclohexane or 2,2-bis[4-(4-aminophenoxy)phenyl]octane may also be used.

These diamines may be used alone or in combination as a mixture of two or more of them. The tetracarboxylic dianhydride and diamine are reacted and polymerized to prepare a polyimide precursor. As the tetracarboxylic acid derivative to be used, a tetracarboxylic dianhydride is commonly employed. The molar ratio of the tetracarboxylic dianhydride and diamine is preferably from 0.8 to 1.2. The closer to 1 the molar ratio is, the larger the polymerization degree of the produced polymer is, like conventional polycondensation reactions.

If the polymerization degree is too small, the strength of the polyimide coating film tends to be inadequate, and if the polymerization degree is too large, the operation efficiency at the time of forming the polyimide coating film sometimes tends to be poor. Accordingly, the polymerization degree of the products in this reaction is preferably from 0.05 to 5.0 dl/g (as measured in N-methylpyrrolidone at a temperature of 30° C. and at a concentration of 0.5 g/dl) in terms of a reduced viscosity in the polyimide precursor solution.

The method for reacting and polymerizing the tetracarboxylic dianhydride and diamine is not particularly limited. However, a method is commonly used wherein the tetracarboxylic dianhydride and diamine are reacted in an organic polar solvent such as N-methylpyrrolidone to prepare a polyimide precursor. Here, the reaction temperature is suitably selected from −20° to 150° C., preferably from −5° to 100° C.

Further, as a method for polymerizing the polyimide precursor, a solution polymerization method is usually preferred. Specific examples of the solvent to be used for the solution polymerization method include N,N-dimethylformamide, N,N-dimethylacetamide, N-methyl-2-pyrrolidone, N-methylcaprolactam, dimethylsulfoxide, tetramethylurea, pyridine, dimethylsulfone, hexamethylphosphoramide and butyl lactone. These solvents may be used alone or in combination as a mixture. Further, a solvent which does not dissolve the polyimide precursor, may be added to the above solvent in an amount within such a range that a uniform solution can still be obtained.

The method for obtaining the polyimide resin which is soluble in an organic solvent and has the repeating units of the formula (II) of the present invention, is not particularly limited. The polyimide resin can usually be obtained by reacting and polymerizing tetracarboxylic acid or its derivative and a diamine to prepare a polyimide precursor, and then being subjected to dehydration ring-closure for imide-modification.

The tetracarboxylic acid or its derivative constituting $R_3$ of the formula (II), is not particularly limited so long as it does not impair solubility of the resulting polyimide resin in an organic solvent. Specific examples of such a tetracarboxylic acid or its derivative include aromatic tetracarboxylic acids such as pyromellitic acid, benzophenone tetracarboxylic acid, biphenyl tetracarboxylic acid and naphthalene tetracarboxylic acid, and their dianhydrides as well as their dicarboxylic acid diacid halides; alicyclic tetracarboxylic acids such as cyclobutane tetracarboxylic acid, cyclopentane tetracarboxylic acid, cyclohexane tetracarboxylic acid and 3,4-dicarboxy-1,2,3,4-tetrahydro-1-naphthalene succinic acid, and their dianhydrides as well as their dicarboxylic acid diacid halides; and aliphatic tetracarboxylic acids such as butane tetracarboxylic acid, and their dianhydrides as well as their dicarboxylic acid diacid halides. Among them, alicyclic tetracarboxylic acids and aliphatic tetracarboxylic acids, and their dianhydrides, and dicarboxylic acid diacid halides thereof are preferred. 3,4-tetrahydro-1-naphthalene succinic acid and its dianhydrides, and dicarboxylic acid diacid halides thereof are particularly preferred.

Further, these tetracarboxylic acid and its derivatives may be used alone or in combination as a mixture of two or more of them.

Specific examples of the diamine which constitutes the solvent-soluble polyimide of the formula (II) are not particularly limited so long as they do not impair solubility of the resulting polyimide resin in an organic solvent. As specific examples thereof, the following may be mentioned. It should be understood that the present invention is by no means restricted to them. However, for the purpose of improving the thermal stability of the alignment of a liquid crystal, p-phenylenediamine is preferred.

Specific examples of the diamine include p-phenylenediamine, 1,4-bis(4-aminophenyl)benzene, 4,4'-diaminobiphenyl, 3,3'-dimethyl-4,4'-diaminobiphenyl, 3,3'-dimethoxy-4,4'-diaminobiphenyl, 3,3'-dihydroxy-4,4'-diaminobiphenyl, 3,3'-dichloro-4,4'-diaminobiphenyl, 3,3'-dicarboxy-4,4'-diaminobiphenyl and 4,4'-bis(4-aminophenoxy)biphenyl; aromatic diamines such as diaminodiphenylmethane, diaminodiphenyl ether, 2,2'-diaminodiphenylpropane, 4,4'-diaminodiphenylsulfone, diaminobenzophenone, 1,3-bis(4-aminophenoxy)benzene, 1,4-bis(4-aminophenoxy)benzene, 4,4'-di(4-aminophenoxy)diphenylsulfone, 2,2-bis[4-(4-aminophenoxy)phenyl] propane and 1,1,1,3,3,3-hexafluoro-2,2-bis[4-(4-aminophenoxy)phenyl]propane; alicyclic diamines such as diaminodicyclohexylmethane, diaminodicyclohexyl ether and diaminocyclohexane; and aliphatic diamines such as 1,2-diaminoethane, 1,3-diaminopropane, 1,4-diaminobutane and 1,6-diaminohexane. Further, a diaminosiloxane of the following formula:

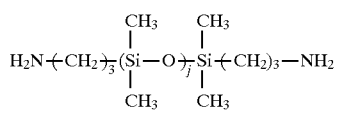

wherein j is an integer of from 1 to 10, may further be mentioned.

Furthermore, for the purpose of increasing the tilt angle, it is necessary to have a bivalent organic group constituting the diamine, in which at least 1 mol %, preferably from 5 to 100 mol % of $R_4$ in the repeating units which constitute the solvent-soluble polyimide of the formula (II) contains a $C_6$–$C_{20}$ long-chain alkyl group or fluorine-containing alkyl group. As specific examples thereof, the following may be mentioned. However, it should be understood that the present invention is by no means restricted to these examples. Namely, a diamine having a long chain alkyl group such as 4,4'-diamino-3-dodecyldiphenyl ether, 1-dodecanoxy-2,4-diaminobenzene, 1,1-bis(4-aminophenyl)cyclohexane or 2,2-bis[4-(4-aminophenoxy) phenyl]octane may also be used.

As examples of diamine compounds having a $C_6$–$C_{20}$ long-chain fluorine-containing alkyl group, the following compounds may be mentioned.

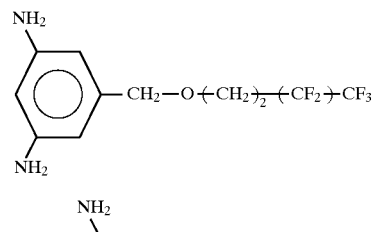

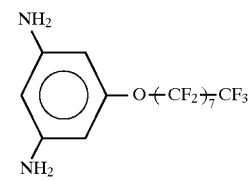

These diamines may be used alone or in combination as a mixture of two or more of them. The method for producing the solvent-soluble polyimide resin of the present invention is not particularly limited. However, it is common to employ a method wherein the tetracarboxylic acid or its derivative and the diamine as mentioned above are reacted and polymerized in a molar ratio within a range of from 0.50 to 1.00 or from 2.00 to 1.01 in an organic solvent to obtain a polyimide resin precursor having a reduced viscosity of from 0.05 to 5.0 dl/g (as measured in N-methyl-2-pyrrolidone at a temperature of 30° C. and at a concentration of 0.5 g/dl), which is then dehydrated for ring closure to form a polyimide resin having a reduced viscosity of from 0.05 to 5.0 dl/g (as measured in N-methyl-2-pyrrolidone at a temperature of 30° C. and at a concentration of 0.5 g/dl).

Here, the temperature for reacting and polymerizing the tetracarboxylic acid or its derivative and the diamine is suitably selected from −20° to 150° C., preferably from −5° to 100° C. As a method for polymerizing the polyimide resin precursor, a solution polymerization method is usually preferred.

Specific examples of the solvent to be used for the solution polymerization method include N,N-dimethylformamide, N,N-dimethylacetamide, N-methyl-2-pyrrolidone, N-methylcaprolactam, dimethylsulfoxide, tetramethylurea, pyridine, dimethylsulfone, hexamethylphosphoramide and butyl lactone.

Since the polyimide resin of the formula (II) is soluble in a solvent, the polyimide precursor obtained by reacting the tetracarboxylic dianhydride and diamine, may be imide-modified as it is in a solution to obtain a solvent-soluble polyimide solution.

To convert the polyimide precursor to the polyimide, a method of heating for dehydration ring-closure is usually employed. The heating temperature for dehydration ring-closure can be selected optionally within a range of from 100° to 350° C., preferably from 120° to 250° C. Further, as another method for converting the polyimide precursor to the polyimide, a method may be employed wherein a conventional catalyst for dehydration ring-closure is used for chemical ring-closure.

The polyimide solution thus obtained may be used as it is, or it may be precipitated in a poor solvent such as methanol or ethanol, and isolated. The polyimide may be used in the form of a powder, or the polyimide powder may be re-dissolved in a proper solvent for use. The solvent for re-dissolving it, is not particularly limited so long as it is capable of dissolving the obtained polyimide resin. It may, for example, be 2-pyrrolidone, N-methylpyrrolidone, N-ethylpyrrolidone, N-vinylpyrrolidone, N,N-dimethylacetamide, N,N-dimethylformamide or γ-butyrolactone.

To obtain the treating agent for liquid crystal alignment of the present invention which contains the polyimide precursor of the formula (I) and the solvent-soluble polyimide of the formula (II), the polyimide precursor of the formula (I) and the solvent-soluble polyimide of the formula (II) are dissolved in a solvent so that the proportion of the solvent-soluble polyimide of the formula (II) is from 1 to 80% by weight based on the total polymer weight of the polyimide precursor of the formula (I) and the solvent-soluble polyimide of the formula (II).

The mixing proportion of the solvent-soluble polyimide of the formula (II) to the polyimide precursor of the formula (I) can optionally be selected within the above range to control the properties of the liquid crystal such as the tilt angle, voltage holding performance and charge-accumulation property. When the proportion of the solvent-soluble polyimide of the formula (II) is at least 80 wt % to the total polymer weight, the effects of the present invention may sometimes be hardly obtainable, such being undesirable.

At this time, as a method for incorporating the polyimide of the formula (II) into the polyimide precursor solution of the formula (I), methods may be mentioned wherein a polyimide powder is directly incorporated or a solution having a polyimide dissolved in an organic solvent is incorporated. Particularly, there is no limitation in the method of incorporation.

The solvent used for the composition of the present invention, is not particularly limited so long as it is capable of dissolving the polyimide resin. It may, for example, be 2-pyrrolidone, N-methylpyrrolidone, N-ethylpyrrolidone, N-vinylpyrrolidone, N,N-dimethylacetamide, N,N-dimethylformamide or γ-butyrolactone.

In addition, even a solvent which is incapable of dissolving the polyimide by itself, may be added to the above solvent within a range not to impair the solubility.

Such a solvent may, for example, be ethyl cellosolve, butyl cellosolve, ethyl carbitol, butyl carbitol, ethyl carbitol acetate or ethylene glycol.

Further, solvents proposed in the present inventors' Japanese Patent Application No. 5-205165, i.e. propylene glycol derivatives such as 1-methoxy-2-propanol, 1-ethoxy-2-propanol, 1-butoxy-2-propanol, 1-phenoxy-2-propanol, propylene glycol monoacetate, propylene glycol diacetate, propylene glycol-1-monomethyl ether-2-acetate, propylene glycol-1- monoethyl ether-2-acetate, dipropylene glycol, 2-(2-methoxypropoxy)propanol, 2-(2-ethoxypropoxy)propanol and 2-(2-butoxypropoxy)propanol, solvents proposed in Japanese Patent Application No. 05-327087, i.e. lactic acid derivatives such as methyl lactate, ethyl lactate, n-propyl lactate, n-butyl lactate and isoamyl lactate, may be used.

With respect to the treating agent for liquid crystal alignment of the present invention thus obtained, the content of the polyimide precursor of the formula (I) and the solvent-soluble polyimide of the formula (II) is not particularly limited so long as a homogeneous solution form is maintained. However, the content is usually from 1 to 15 wt %, preferably from 2 to 8 wt % as a solid content.

Further, for the purpose of further improving the adhesive property between the polyimide resin film and the substrate, additives such as a coupling agent may be added to the resulting resin solution.

For the preparation of the liquid crystal alignment film, the composition for the treating agent for liquid crystal alignment of the present invention is coated on a transparent substrate such as a glass or plastic substrate equipped with transparent electrodes and baked to form a polyimide film, and then the film surface is subjected to a rubbing treatment.

By using the treating agent for liquid crystal alignment of the present invention, it is possible to obtain a liquid crystal alignment film by which the properties such as the voltage holding ratio, tilt angle and charge-accumulation property can be satisfied at the same time, and to obtain liquid crystal devices having properties superior to those of conventional devices.

BEST MODE FOR CARRYING OUT THE INVENTION

Now, the present invention will be described in further detail with reference to Examples. However, it should be understood that the present invention is by no means restricted to such specific Examples.

EXAMPLE 1

20.02 g (0.1 mol) of 4,4'-diaminodiphenyl ether was dissolved in 230 g of N-methylpyrrolidone (NMP), and 9.60 g (0.05 mol) of cyclobutane tetracarboxylic dianhydride and 10.90 g (0.05 mol) of pyromellitic dianhydride were added thereto, and the mixture was reacted at room temperature for 4 hours to obtain a polyimide precursor having a reduced viscosity of 0.9 dl/g (as measured in N-methyl-2-pyrrolidone at a temperature of 30° C. and a concentration of 0.5 g/dl). This solution was diluted with NMP to a solid content concentration of 6% to obtain a polyimide precursor solution (A-1).

30.03 g (0.1 mol) of 3,4-dicarboxy-1,2,3,4-tetrahydro-1-naphthalene succinic dianhydride (hereinafter referred to as TDA), 9.72 g (0.09 mol) of p-phenylene diamine and 3.48 g (0.01 mol) of 1-hexadecanoxy-2,4-diaminobenzene were reacted in 245 g of NMP at room temperature for 10 hours to prepare a polyamic acid intermediate solution.

Into 50 g of the polyamic acid intermediate solution, 10.8 g of acetic anhydride and 5.0 g of pyridine were added as catalysts for imide-modification, and then the mixture was reacted at 50° C. for 3 hours to prepare a polyimide resin solution. This solution was poured into 500 ml of methanol, and the obtained white precipitate was filtered and dried to obtain a white polyimide resin powder. The reduced viscosity ηsp/c of the resulting polyimide resin was 0.43 dl/g (in a 0.5 wt % NMP solution, 30° C.).

0.6 g of this powder was dissolved in 9.4 g of γ-butyrolactone to obtain a solvent-soluble polyimide resin solution (B-1) having a solid content concentration of 6%.

Then, the polyimide precursor solution (A-1) and the solvent-soluble polyimide resin solution (B-1) were mixed at a weight ratio of (A-1)/(B-1)=4/1, and diluted with NMP, and the solution was thoroughly stirred to obtain a uniform solution having a total solid content concentration of 4%. This solution was spin coated at 3000 rpm on a glass substrate equipped with transparent electrodes, and then baked at 180° C. for 60 minutes to obtain a polyimide film having a film thickness of 1000 A.

This coating film was rubbed with a cloth and fabrication was conducted so that the rubbing directions would be opposite and in parallel while interposing spacers of 50μ, and then liquid crystal (ZLI-4792 manufactured by Merck Co.) was injected therein to prepare a liquid crystal cell.

The alignment conditions of this liquid crystal cell were observed by a polarization microscope to confirm a uniform alignment without defects. Further, the tilt angle of this liquid crystal cell was measured by a crystal rotation method to find to be 4.3° and show a high tilt angle required for a TFT alignment film.

Then, to measure electrical properties of the liquid crystal cell, using the same substrate as above having a polyimide film formed thereon and being subjected to the rubbing treatment, spacers of 6μ were sprayed on the film surface and then fabrication was conducted so that the rubbing directions would be substantially at right angles, and liquid crystal (MLC-2003 manufactured by Merck Co.) was injected therein to prepare a 900 twist liquid crystal cell. The alignment conditions of this liquid crystal cell was inspected by a polarization microscope to confirm a uniform alignment without defects.

The voltage holding ratio of this liquid crystal cell was measured to find values of high level of 98% at 23° C. and 80% at 90° C. Further, rectangular waves of 30 Hz/±3V having a direct current of 3 V superimposed thereon were applied to this cell at 23° C. for 60 minutes. Immediately after the direct current of 3 V was cut off after 60 minutes, the residual voltage remaining in the liquid crystal cell was measured by an optical flicker elimination method to find a charge-accumulation of as low as 0.1 V.

Further, after the liquid crystal cell was heat treated at 120° C. for 60 minutes, the tilt angle of the liquid crystal was measured again to find to be 4.4° and thermally stable.

EXAMPLE 2

The polyimide precursor solution (A-1) and solvent-soluble polyimide resin solution (B-1) prepared in Example 1 were mixed at a weight ratio of (A-1)/(B- 1)=1/4, and the mixture was diluted with NMP and thoroughly stirred to obtain a uniform solution having the total solid content concentration of 4%. This solution was spin coated at 2600 rpm on a glass substrate equipped with transparent electrodes, and baked at 180° C. for 60 minutes to obtain a polyimide film having a film thickness of 1000 A.

A liquid crystal cell was prepared hereafter in the same manner as in Example 1. The alignment conditions of the liquid crystal cell were inspected by a polarization microscope to confirm a uniform alignment without defects. Further, the tilt angle of this liquid crystal cell was measured by a crystal rotation method to find to be 5.0° and have a high tilt angle required for a TFT alignment film. The voltage holding ratio of the liquid crystal cell was measured to find to have values of high level of 98% at 23° C. and 85% at 90° C. Further, the residual voltage remaining in the liquid crystal cell was measured to find that the charge-accumulation was as low as 0.2 V.

Further, the liquid crystal cell was heat treated at 120° C. for 60 minutes, and the tilt angle of the liquid crystal was measured again to find to be 4.9° and thermally stable.

EXAMPLE 3

20.02 g (0.1 mol) of 4,4'-diaminodiphenyl ether was dissolved in 237 g of N-methylpyrrolidone (NMP), and 21.4 g (0.1 mol) of pyromellitic dianhydride was added thereto, and the mixture was reacted at room temperature for 4 hours to obtain a polyimide precursor having a reduced viscosity of 1.0 dl/g (as measured in N-methyl-2-pyrrolidone at a temperature of 30° C. and a concentration of 0.5 g/dl). This solution was diluted with NMP to a solid content concentration of 6% to obtain a polyimide precursor solution (A-2).

A solvent-soluble polyimide resin solution (B-1) was prepared hereafter in the same manner as in Example 1. The polyimide precursor solution (A-2) and the solvent-soluble polyimide resin solution (B-1) thus obtained were mixed at a weight ratio of (A-2)/(B-1)=4/1, and the mixture was diluted with NMP, and the solution was thoroughly stirred to obtain a uniform solution having a total solid content concentration of 4%. This solution was spin coated at 3500 rpm on a glass substrate equipped with transparent electrodes and baked at 180° C. for 60 minutes to obtain a polyimide film having a film thickness of 1000 A.

A liquid crystal cell was prepared hereafter in the same manner as in Example 1. The tilt angle of the liquid crystal was 4.0°, the voltage holding ratio was as high as 97% at 23° C. and 82% at 90° C., and the residual voltage was as low as 0.1 V.

Further, the liquid crystal cell was heat treated at 120° C. for 60 minutes, and then the tilt angle of the liquid crystal was measured again to find to be 4.1° C. and thermally stable.

EXAMPLE 4

20.02 g (0.1 mol) of 4,4'-diaminodiphenyl ether was dissolved in 170 g of N-methylpyrrolidone (NMP), and 7.84 g (0.04 mol) of cyclobutane tetracarboxylic dianhydride and 2.18 g (0.01 mol) of pyromellitic dianhydride were added thereto. The mixture was reacted at room temperature for 4 hours to obtain a polyimide precursor having a reduced viscosity of 1.0 dl/g (as measured in N-methyl-2-pyrrolidone at a temperature of 30° C. and a concentration of 0.5 g/dl). This solution was diluted with NMP to a solid content concentration of 6% to obtain a polyimide precursor solution (A-3).

The polyimide precursor solution (A-3) and a solvent-soluble polyimide resin solution (B-1) prepared in the same manner as in Example 1 were mixed at a weight ratio of (A-3)/(B-1)=4/1, and the mixture was diluted with NMP, and then thoroughly stirred to obtain a uniform solution having a total solid content concentration of 4%. This solution was spin coated at 3000 rpm on a glass substrate equipped with transparent electrodes, and baked at 180° C. for 60 minutes to obtain a polyimide film having a film thickness of 1000 A.

A liquid crystal cell was prepared hereafter in the same manner as in Example 1. The tilt angle of the liquid crystal was 4.0°, the voltage holding ratio was as high as 97% at 23° C. and 82% at 90° C. and the residual voltage was as low as 0.4 V.

Further, the liquid crystal cell was heat treated at 120° C. for 60 minutes, and then the tilt angle of the liquid crystal was measured again to find to be 4.0° and thermally stable.

EXAMPLE 5

19.83 g (0.1 mol) of 4,4'-diaminodiphenyl methane was dissolved in 228 g of N-methylpyrrolidone (NMP), and 9.60 g (0.05 mol) of cyclobutane tetracarboxylic dianhydride and 10.90 g (0.05 mol) of pyromellitic dianhydride were added thereto, and the mixture was reacted at room temperature for 4 hours to obtain a polyimide precursor having a reduced viscosity of 0.9 dl/g (as measured in N-methyl-2-pyrrolidone at a temperature of 30° C. and a concentration of 0.5 g/dl). This solution was diluted with NMP to a solid content concentration of 6% to obtain a polyimide precursor solution (A-4).

Then, in the same manner as in Example 1, the polyimide precursor solution (A-4) and the solvent-soluble polyimide resin solution (B-1) were mixed at a weight ratio of (A-1)/(B-1)=4/1 and the mixture was diluted with NMP and thoroughly stirred to obtain a uniform solution having a total solid content concentration of 4%. This solution was spin coated at 3000 rpm on a glass substrate equipped with transparent electrodes, and baked at 180° C. for 60 minutes to obtain a polyimide film having a film thickness of 1000 Å.

A liquid crystal cell was prepared hereafter in the same manner as in Example 1. The tilt angle of the liquid crystal was 4.3°, the voltage holding ratio was as high as 98% at 23° C. and 90% at 90° C., and the residual voltage was as low as 0.1 V.

Further, this liquid crystal cell was heat treated at 120° C. for 60 minutes, and the tilt angle of the liquid crystal was measured again to find to be 4.2° and thermally stable.

COMPARATIVE EXAMPLE 1

The polyimide precursor solution prepared in Example 1 was diluted with NMP to a solid content concentration of 4% to obtain a polyimide precursor solution (A).

Using only the polyimide precursor solution, a polyimide film was formed on a glass substrate equipped with transparent electrodes and a liquid crystal cell was prepared hereafter in the same manner as in Example 1.

As a result, the tilt angle of the liquid crystal was as low as 2.1°. The residual voltage was as low as 0.3 V, but the voltage holding ratio was as low as 80% at room temperature and 70% at 90° C. Accordingly, it was impossible to obtain a high tilt angle and a high voltage holding ratio and at the same time a low charge-accumulation property.

COMPARATIVE EXAMPLE 2

0.6 g of the solvent-soluble polyimide powder obtained in Example 1 was dissolved in 14.6 g of γ-butyrolactone to obtain a solvent-soluble polyimide resin solution (B) having a solid content concentration of 4%.

Using only the solvent-soluble polyimide solution (B), a polyimide film was formed on a glass substrate equipped with transparent electrodes, and a liquid crystal cell was prepared hereafter in the same manner as in Example 1.

As a result, the tilt angle of the liquid crystal was as high as 7.0°. Further, the voltage holding ratio was as high as 99% at room temperature and 90% at 90° C., but the residual voltage was as large as 1.0 V. Accordingly, it was impossible to obtain a high tilt angle and a high voltage holding ratio and at the same time a low charge-accumulation property.

COMPARATIVE EXAMPLE 3

The polyimide precursor solution prepared in Example 3 was diluted with NMP to a solid content concentration of 4% to obtain a polyimide precursor solution (A-5).

Using only the polyimide precursor solution, a polyimide film was formed on a glass substrate equipped with transparent electrodes, and a liquid crystal cell was prepared hereafter in the same manner as in Example 1.

As a result, the tilt angle of the liquid crystal was as low as 2.2°. Further, the residual voltage was as low as 0.2 V, but the voltage holding ratio was as low as 78% at room temperature and 40% at 90° C. Accordingly, it was impossible to obtain a high tilt angle and a high voltage holding ratio, and at the same time a low charge-accumulation property.

COMPARATIVE EXAMPLE 4

The polyimide precursor solution prepared in Example 4 was diluted with NMP to a solid content concentration of 4% to obtain a polyimide precursor solution (A-6).

Using only the polyimide precursor solution, a polyimide film was formed on a glass substrate equipped with transparent electrodes, and a liquid crystal cell was prepared hereafter in the same manner as in Example 1.

As a result, the tilt angle of the liquid crystal was as low as 2.2°. Further, the residual voltage was as low as 0.4 V, but the voltage holding ratio was as low as 92% at room temperature and 60% at 90° C. Accordingly, it was impossible to obtain a high tilt angle and a high voltage holding ratio, and at the same time a low charge-accumulation property.

COMPARATIVE EXAMPLE 5

The polyimide precursor solution prepared in Example 5 was diluted with NMP to a solid content concentration of 4% to obtain a polyimide precursor solution (A-7).

Using only the polyimide precursor solution, a polyimide film was formed on a glass substrate equipped with transparent electrodes, and a liquid crystal cell was prepared hereafter in the same manner as in Example 1.

As a result, the tilt angle of the liquid crystal was as low as 2.0°. Further, the residual voltage was as low as 0.1 V, but the voltage holding ratio was 95% at room temperature and 70% at 90° C. Accordingly, it was impossible to obtain a high tilt angle and a high voltage holding ratio, and at the same time a low charge-accumulation property.

We claim:
1. A composition comprising
   1) a polyimide precursor which has a repeating unit of the formula (I):

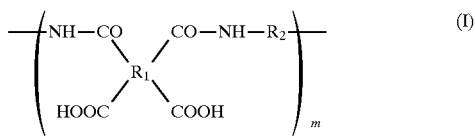

wherein $R_1$ is a tetravalent organic group, $R_2$ is a bivalent organic group, and m is a positive integer, said precursor having a reduced viscosity of from 0.05 to 5.0 dl/g as measured in N-methylpyrrolidone at a temperature of 30° C. and at a concentration of 0.5 g/dl, and 2) a solvent-soluble polyimide resin which has a repeating unit of the formula (II):

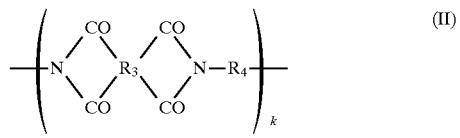

wherein $R_3$ is a tetravalent organic group, $R_4$ is a bivalent organic group and k is a positive integer, said resin having a reduced viscosity of from 0.05 to 5.0 dl/g as measured in N-methylpyrrolidone at a temperature of 30° C. and at a concentration of 0.5 g/dl, wherein at least 1 mol % of $R_4$ of the solvent-soluble polyimide resin of formula (II) is a bivalent organic group which has a long-chain alkyl group or fluorine-containing alkyl group with a carbon number of at least 6, and wherein the solvent-soluble polyimide resin of the formula (II) is present in an amount of from 1 to 80% by weight based on total polymer weight.

2. The composition according to claim 1, wherein $R_1$ of the polyimide precursor of the formula (I) is a tetravalent organic group derived from an aromatic tetracarboxylic dianhydride.

3. The composition according to claim 1, wherein $R_2$ of the polyimide precursor of the formula (I) is a bivalent organic group derived from 4,4'-diaminodiphenyl methane.

4. The composition according to claim 1, wherein $R_3$ of the solvent-soluble polyimide of the formula (II) is a tetravalent organic group derived from an alicyclic or aliphatic tetracarboxylic acid or its derivative.

5. The composition according to claim 1, wherein $R_3$ of the solvent-soluble polyimide of the formula (II) is a tetravalent organic group derived from 3,4-dicarboxy-1,2,3,4-tetrahydro-1-naphthalene succinic dianhydride.

6. The composition according to claim 1, wherein $R_4$ of the solvent-soluble polyimide of the formula (II) is a bivalent organic group derived from p-phenylene diamine.

7. The composition as claimed in claim 1, wherein $R_1$ and $R_3$ individually are selected from the group consisting of tetravalent pyromellitic, benzophenone, biphenyl, naphthylene, cyclobutane, cyclopentane, cyclohexane and butane groups.

8. The composition as claimed in claim 1, wherein $R_2$ and $R_4$ individually are selected from the group consisting of bivalent p-phenylene, 4,4'-biphenyl optionally disubstituted at the 3,3' position by methyl, methoxy, hydroxy, chloro or carboxy groups, and 4,4'-diphenyl methane.

9. The composition as claimed in claim 7 wherein $R_2$ and $R_4$ individually are selected from the group consisting of bivalent p-phenylene, 4,4'-biphenyl optionally disubstituted at the 3,3' position by methyl, methoxy, hydroxy, chloro or carboxy groups, and 4,4'-diphenyl methane.

10. The composition as claimed in claim 1, wherein said bivalent organic group which has a long-chain alkyl group or fluorine-containing alkyl group with a carbon number of at least 6 is selected from bivalent 4,4'-3-dodecyl diphenyl ether and 1-dodecanoxy-2,4-benzene groups.

11. The composition as claimed in claim 8, wherein said bivalent organic group which has a long-chain alkyl group or fluorine-containing alkyl group with a carbon number of at least 6 is selected from bivalent 4,4'-3-dodecyl diphenyl ether and 1-dodecanoxy-2,4-benzene groups.

12. The composition as claimed in claim 9, wherein said bivalent organic group which has a long-chain alkyl group or fluorine-containing alkyl group with a carbon number of at least 6 is selected from bivalent 4,4'-3-dodecyl diphenyl ether and 1-dodecanoxy-2,4-benzene groups.

13. The composition as claimed in claim 1, wherein said bivalent organic group which has a long-chain alkyl group or fluorine-containing alkyl group with a carbon number of at least 6 contains a $C_6$–$C_{20}$ long-chain alkyl group or fluorine-containing alkyl group.

* * * * *

UNITED STATES PATENT AND TRADEMARK OFFICE
CERTIFICATE OF CORRECTION

PATENT NO. : 5,858,274
DATED : January 12, 1999
INVENTOR(S) : Makoto MISHINA, et al.

It is certified that error appears in the above-identified patent and that said Letters Patent is hereby corrected as shown below:

On the title page, item [73], the assignee's address should be:

--Tokyo, Japan--

Signed and Sealed this

Third Day of August, 1999

Attest:

Q. TODD DICKINSON

*Attesting Officer*  *Acting Commissioner of Patents and Trademarks*